United States Patent
Ying et al.

(10) Patent No.: US 7,243,191 B2
(45) Date of Patent: Jul. 10, 2007

(54) COMPRESSING DATA IN A CACHE MEMORY

(75) Inventors: Zhiwei Ying, Shanghai (CN); Guei-Yuan Lueh, San Jose, CA (US); Jinzhan Peng, Beijing (CN); Anwar Ghuloum, Mountain View, CA (US); Ali-Reza Adl-Tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 273 days.

(21) Appl. No.: 10/930,882

(22) Filed: Aug. 31, 2004

(65) Prior Publication Data

US 2006/0047916 A1    Mar. 2, 2006

(51) Int. Cl.
*G06F 12/00* (2006.01)
*G06F 13/00* (2006.01)
*G06F 13/28* (2006.01)

(52) U.S. Cl. ...................... 711/118; 711/144
(58) Field of Classification Search ................ 711/118, 711/144
See application file for complete search history.

(56) References Cited

U.S. PATENT DOCUMENTS

| | | | |
|---|---|---|---|
| 6,272,595 B1 | 8/2001 | Rosen et al. ................ 711/128 |
| 6,640,283 B2* | 10/2003 | Naffziger et al. ........... 711/118 |
| 6,643,742 B1 | 11/2003 | Vidwans et al. ............ 711/136 |
| 6,687,790 B2 | 2/2004 | Zager et al. ................ 711/128 |
| 6,735,673 B2* | 5/2004 | Kever ........................ 711/118 |
| 6,795,897 B2* | 9/2004 | Benveniste et al. ......... 711/118 |
| 7,143,239 B2* | 11/2006 | DeLan ....................... 711/128 |
| 2003/0135694 A1* | 7/2003 | Naffziger et al. ........... 711/118 |
| 2004/0030847 A1* | 2/2004 | Tremaine .................... 711/154 |
| 2005/0071562 A1* | 3/2005 | Adl-Tabatabai et al. .... 711/118 |

OTHER PUBLICATIONS

IBM TDB #NNRD454150, "Cache System having ability to store compressed and uncompressed lines".*
U.S. Appl. No. 10/663,221, filed Dec. 29, 2003, Adl-Tabatabai et al.
Wilson, Paul R., Scott F. Kaplan and Yannis Smaragdakis. "The Case for Compressed Caching in Virtual Memory Systems", USENIX Technical Conference 1999. http://www.cs.utexas.edu/users/oops/.
Adl-Tabatabai, Ali-Reza, et al. "Improving 64-Bit Java IPF Performance by Compressing Heap References" Microprocessor Technology Lab, Intel Corporation. Proceedings of the International Symposium on Code Generation and Optimization 2004. Sep. 2004.

* cited by examiner

*Primary Examiner*—Matthew Kim
*Assistant Examiner*—Edward J Dudek
(74) *Attorney, Agent, or Firm*—Trop, Pruner & Hu, P.C.

(57) ABSTRACT

In one embodiment, the present invention includes a cache memory having a plurality of cache lines to store data, in which at least some of the cache lines are adapted to store data in a compressed state. The cache memory also may include a first tag corresponding to each of the cache lines to indicate whether data in the corresponding cache line is compressible.

5 Claims, 6 Drawing Sheets

COMPRESSING DATA IN A CACHE MEMORY

BACKGROUND

The present invention relates generally to memory devices, and more particularly to cache memories. A cache memory is a random access memory that buffers data from a main memory. A cache memory is typically employed to provide high bandwidth memory accessing to a processor. Typically, such a cache memory reflects selected locations of the main memory. A typical memory contains a memory array organized into a set of cache blocks, often referred to as cache lines. A cache memory is usually smaller than the corresponding main memory. As a consequence, each cache line stored in the cache memory includes a corresponding address tag that identifies the main memory location for that cache line.

The increasing gap between memory and processor speeds continues to challenge computer architects. Enabled by increasing process densities, architects have responded to this challenge partly by dedicating an increasing portion of a processor's real estate to large caches, thereby increasing cache capacity. For example, the caches in modem microprocessors consume over half of the total chip real estate. However, leakage current in large data arrays increases power consumption and pushes power envelopes. These factors therefore limit cache sizes, which require more accesses to main memory, and thus increase bottlenecks in processor operation.

A need thus exists for improved caching mechanisms.

DETAILED DESCRIPTION

Figure 1:
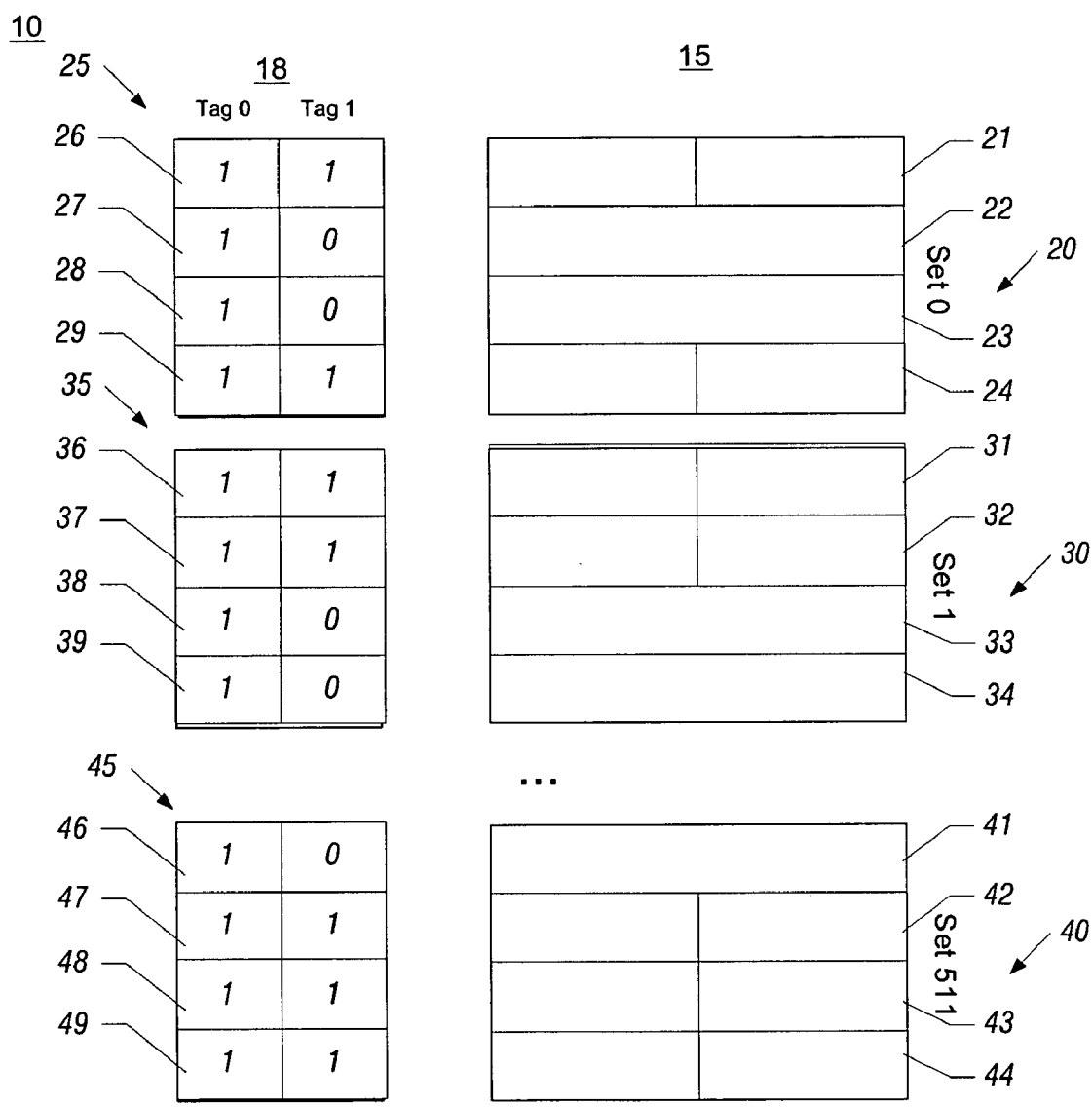
FIG. 1 is a block diagram of a physical cache organization for a cache memory in accordance with one embodiment of the present invention.

In various embodiments, cache lines may be opportunistically compressed to effectively hold more data in each line. During operation a cache may be filled in a conventional manner, and compression may occur in connection with replacement events. In such manner, a fixed-width physical cache line implementation is used while providing a variable-length logical cache line organization. As used herein, a logical line is the unit of data that a cache transacts (i.e., the size of a cache transaction). Read/write misses may be flexibly handled depending on the use (or non-use) of compression elsewhere in a memory hierarchy.

Any block-based compression algorithm may be used as a compression scheme for a cache in accordance with an embodiment of the present invention. For example, possible algorithms include dictionary-based compression (such as Wilson-Kaplan (WK), Lempel-Ziv (LZ), or X-Match), sign-bit compression, run-length compression or the like, although the scope of the present invention is not so limited.

In certain embodiments, data held in physical cache lines may be compressed by a factor of two or not at all. Each line occupies the same amount of physical cache memory, and tag information corresponding to each line indicates whether one or two data blocks are present. In one embodiment, the tag information may include a first tag portion and a second tag portion. When both tag portions are valid, the physical cache line holds two compressed memory blocks. For example, in an embodiment having a 64 byte cache line, every 32 bytes represents one compressed cache line. While these compressed memory blocks may come from adjacent address spaces, compression in accordance with an embodiment of the present invention is not so limited, and a single cache line may hold compressed blocks from disparate address spaces or locations in a memory hierarchy.

The tag information may indicate that a data block stored in a cache line is compressible, meaning that a target compression algorithm can compress the data by a desired amount. For example, in various embodiments in which compression is performed by a factor of two, a data block is compressible if it can be compressed by at least a factor of two. Additionally, the tag information may further indicate that the data stored in an associated cache line is actually compressed. That is, the tag information may also indicate compression state of a cache line. In such manner, one or two physical cache lines map to a variable length cache line through the use of the tag information.

For example, in one embodiment the first tag portion may indicate compressibility, while the second tag portion may indicate compression state. In an embodiment in which data is compressed by a factor of two, the first tag portion may be one bit and the second tag portion may be one bit, although in other embodiments different numbers of bits may be used. For example, in other embodiments, more tag bits may be added to allow for higher compression ratios, such as a 4:1 ratio. While described in this manner, it is to be understood that in other embodiments, the first tag portion may be used to indicate a compression state of a cache line and the second tag portion may be used to indicate compressibility.

Referring now to FIG. 1, shown is a block diagram of a physical cache organization for a cache memory in accordance with one embodiment of the present invention. As shown in FIG. 1, cache memory 10 may be a N-way set associative cache, for example, a 512 set 4-way set associative cache, although the scope of the present invention is not so limited.

As shown, cache memory 10 includes a tag array 18 and a data array 15. Each set of data array 15 includes a plurality of cache lines. More specifically, as shown in FIG. 1, a first set 20 (i.e., set 0) includes four cache lines 21-24. Similarly, a second set 30 (i.e., set 1) includes four cache lines 31-34, and a final set 40 (i.e., set 511) includes four cache lines 41-44. As shown in FIG. 1, the physical cache organization is formed of data array 15 that includes a plurality of cache lines, all of the same physical length. For example, each cache line may be 64 bytes, although the scope of the present invention is not so limited. However, as shown in FIG. 1 certain cache lines within data array 15 are compressed such that data of two compressed memory blocks are in each such compressed cache line. Thus for a 64 byte-cache line, each 32 bytes represents one of the data blocks. The tag information corresponding to a given cache line may be used to determine whether the particular cache line is compressed.

Still referring to FIG. 1, each set of data array 15 includes a corresponding set of tag array 18. While shown in FIG. 1 as including a first tag portion (i.e., tag 0) and a second tag portion (i.e., tag 1), it is to be understood that tag array 18 may include further information, such as an address tag used to determine if a requested line is present within data array 15. Tag array 18 includes a first tag set 25 that includes corresponding tag portions to the cache lines of set 20, namely tag information 26-29. Similarly, a second tag set 35 includes corresponding tag information 36-39 for set 30, and tag set 45 includes corresponding tag information 46-49 for set 40.

As shown in FIG. 1, tag information 26 includes two valid tag portions, thus indicating that corresponding cache line 21 includes two compressed data blocks. In contrast, tag information 27 (for example) in which only the first tag portion is valid, indicates that corresponding cache line 22 is not compressed, although it is compressible. In similar fashion, tag information 28 indicates that corresponding cache line 23 is not compressed, although it is compressible, and tag information 29 indicates (because the first and second tag portions are valid) that corresponding cache line 24 is in a compressed state. The similar tag portions of tag sets 35 and 45 indicate compressibility and compression state of corresponding data sets 30 and 40.

Figure 2:
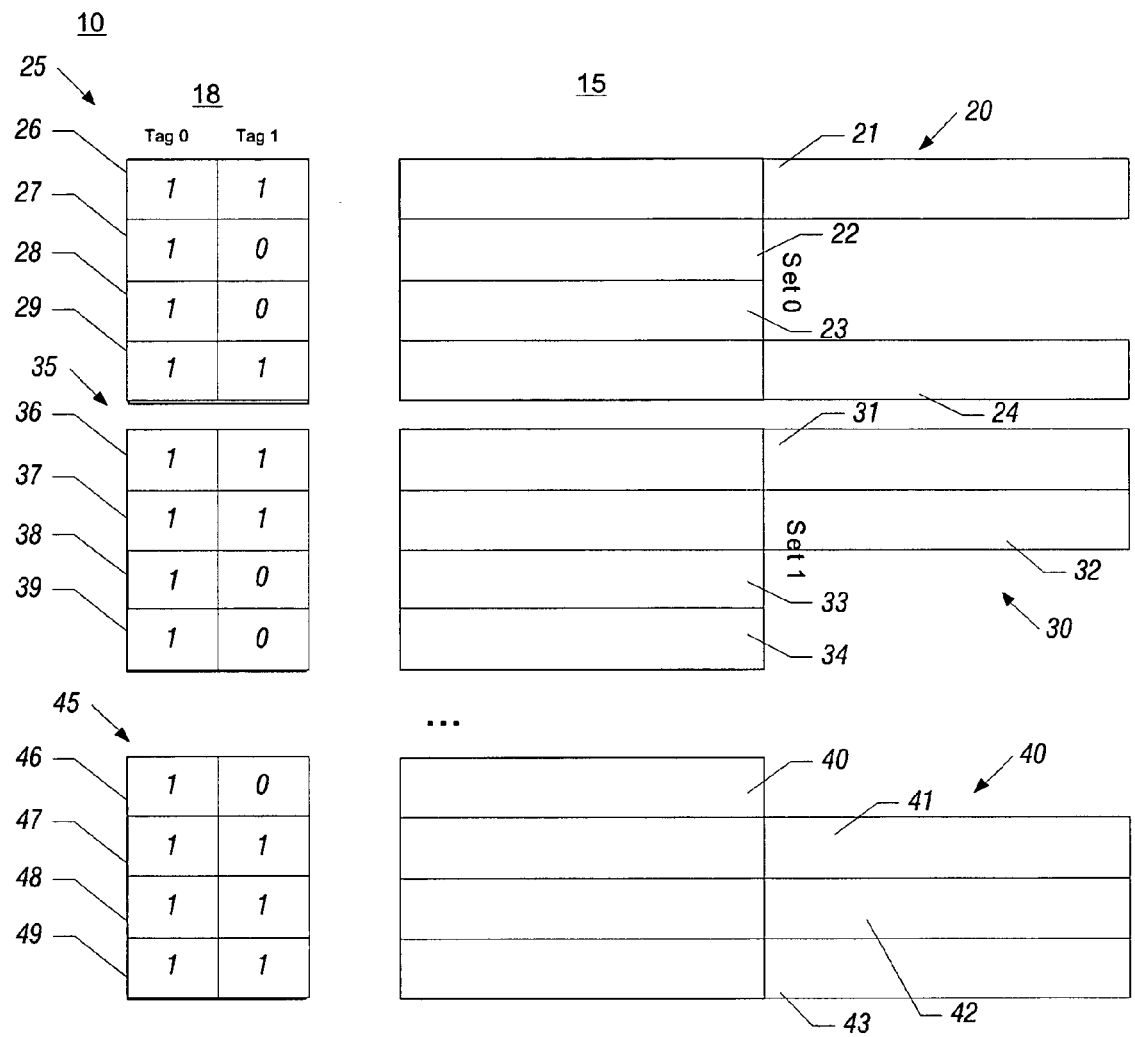
FIG. 2 is a block diagram of a logical cache organization of the cache memory of FIG. 1.

Referring now to FIG. 2, shown is a block diagram of a logical cache organization for the cache memory of FIG. 1. As shown in FIG. 2, while the physical cache memory represented by data array 15 is identical to that of FIG. 1, the logical organization differs. More specifically, for cache lines having corresponding valid first and second tag portions, the logical cache line stores two compressed data blocks, rather than a single uncompressed data block. Thus, as shown in FIG. 2, cache line 21, while still formed of a single 64 byte cache line, includes compressed data of two data blocks (i.e., two 64 byte data blocks). In contrast, cache line 22 includes a single uncompressed data block, as the corresponding tag information 27 indicates that the cache line is in an uncompressed state.

Thus, from the status of the two tag portions, the compression state of an accompanying cache line may be determined. If the line is compressed, then both tag portions are valid. If the first tag portion is valid and second tag portion is invalid, the corresponding cache line is not compressed. If neither tag portion is valid, the corresponding cache line includes an uncompressible data block. As used herein, an uncompressible data block means a data block that a compression algorithm cannot compress by a predetermined factor. For example, in an embodiment in which an algorithm has a target compression ratio of 2:1, if a data block cannot be compressed by at least a factor of two, it is an uncompressible data block.

In determining whether a cache hit occurs, and data of a given address (e.g., a logical or physical address received from a processor) is present in a cache, at least a portion of the address may be used. Specifically, these portions of the address may include an index portion, an address tag portion, a set portion, and an offset portion, for example. The index portion may be used to index into a tag array, while the tag portion may be used to determine whether a tag match exists. Similarly, the set portion may be used to determine a given set, and an offset portion may be used to later determine an offset into a particular cache line.

Since a cache line may contain one or two blocks from different address spaces, a validation check of the tag information may be performed in determining whether a tag match exists. Therefore, the tag match is effectively variable length, depending on whether the line is compressed or not.

Figure 3:
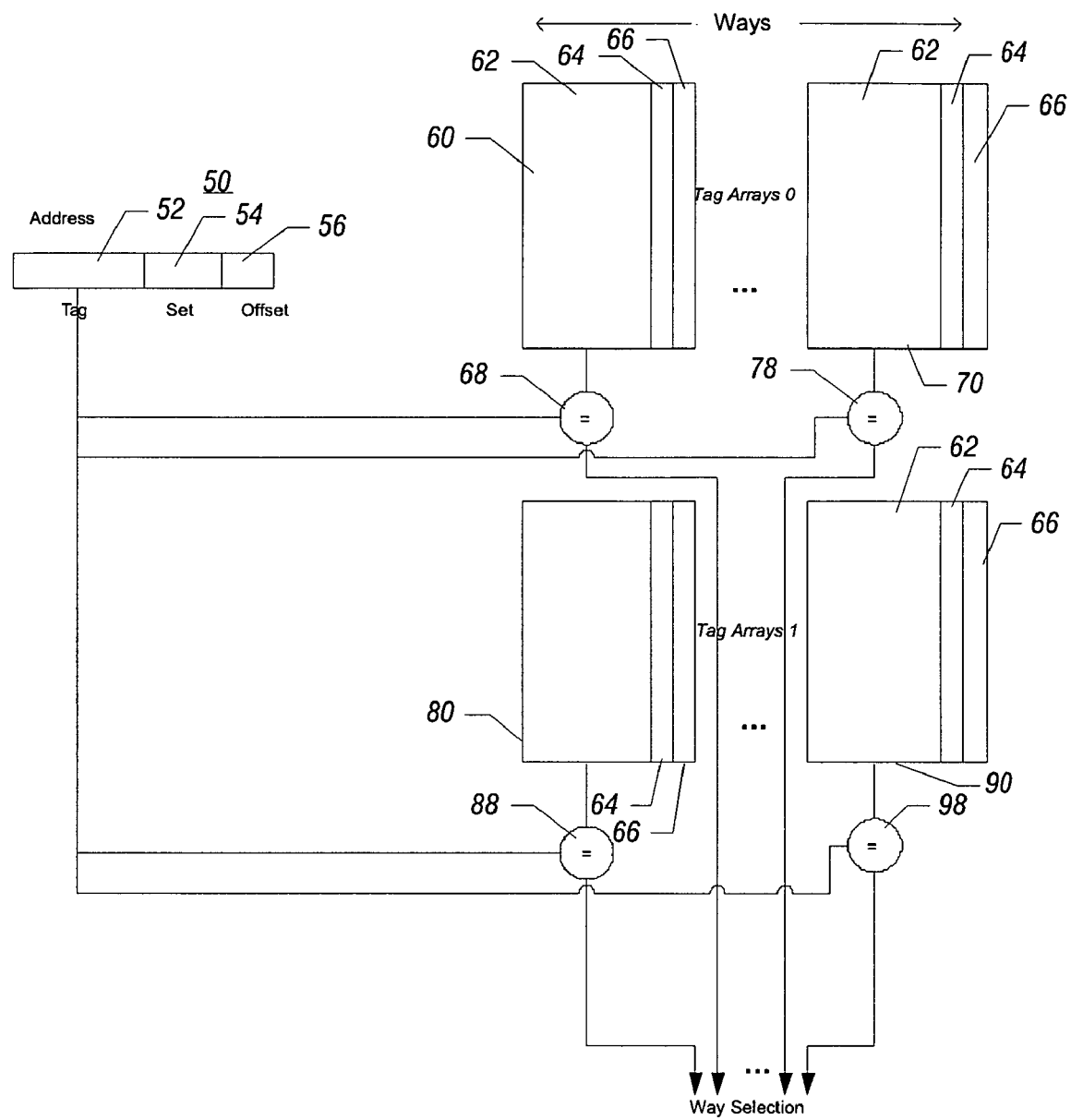
FIG. 3 is a block diagram of way selection logic in accordance with one embodiment of the present invention.

Referring now to FIG. 3, shown is way selection logic for a cache memory in accordance with an embodiment of the present invention. As an example, way selection logic may be implemented in a cache controller associated with a cache memory. In the embodiment of FIG. 3, each 64 byte cache line may be split into two 32 byte lines, and may be associated with two address tags. If a cache line is compressed, a different address tag may be present in the multiple tag arrays for the cache line, while a single address tag may be present in both tag arrays if an uncompressed line exists.

As shown in FIG. 3, the way selection logic may receive an address tag 52 of an address 50. As described above, address 50 may be a logical or physical address corresponding to a demand request provided by a processor. As shown, address 50 may also include a set portion 54 and an offset portion 56. However, it is to be understood that in other embodiments, additional portions of the address may be present and used in accessing a cache.

As further shown in FIG. 3, each cache line may be associated with an entry in multiple tag arrays. Specifically, FIG. 3 shows that for each way of a cache (e.g., a N-way cache), one of first tag arrays 60 and 70 (i.e., tag arrays 0) and second tag arrays 80 and 90 (i.e., tag arrays 1) are present. Each tag array includes an address tag field 62, a first tag portion field 64 and a second tag portion field 66. Also shown in FIG. 3, each tag array is coupled to a logical operator, namely a logical AND block that may be formed from a plurality of AND gates. The logical operators are shown as having reference numerals 68, 78, 88, and 98.

In operation, address tag 52 is provided to the logical operators to check for a match within a corresponding entry in address tag field 62. Depending on the state of the associated first tag portion field 64 and second tag portion field 66, if a cache line is compressed, only a single address tag match is present, and only one tag is selected (e.g., either one from tag arrays 0 or one from tag arrays 1). If instead the tag information fields indicate that a cache line is not compressed, a pair of companion address tags from address tag field 62 (e.g., one from tag arrays 0 and one from tag arrays 1) may be selected together using the logical operators if a tag match occurs. Thus, if a cache line is compressed, a single address tag in one of the tag arrays corresponding to half of the physical cache line is selected on a tag match. If the cache line is uncompressed, an address tag corresponding to the entire physical cache line is selected in two tag arrays.

Figure 4:
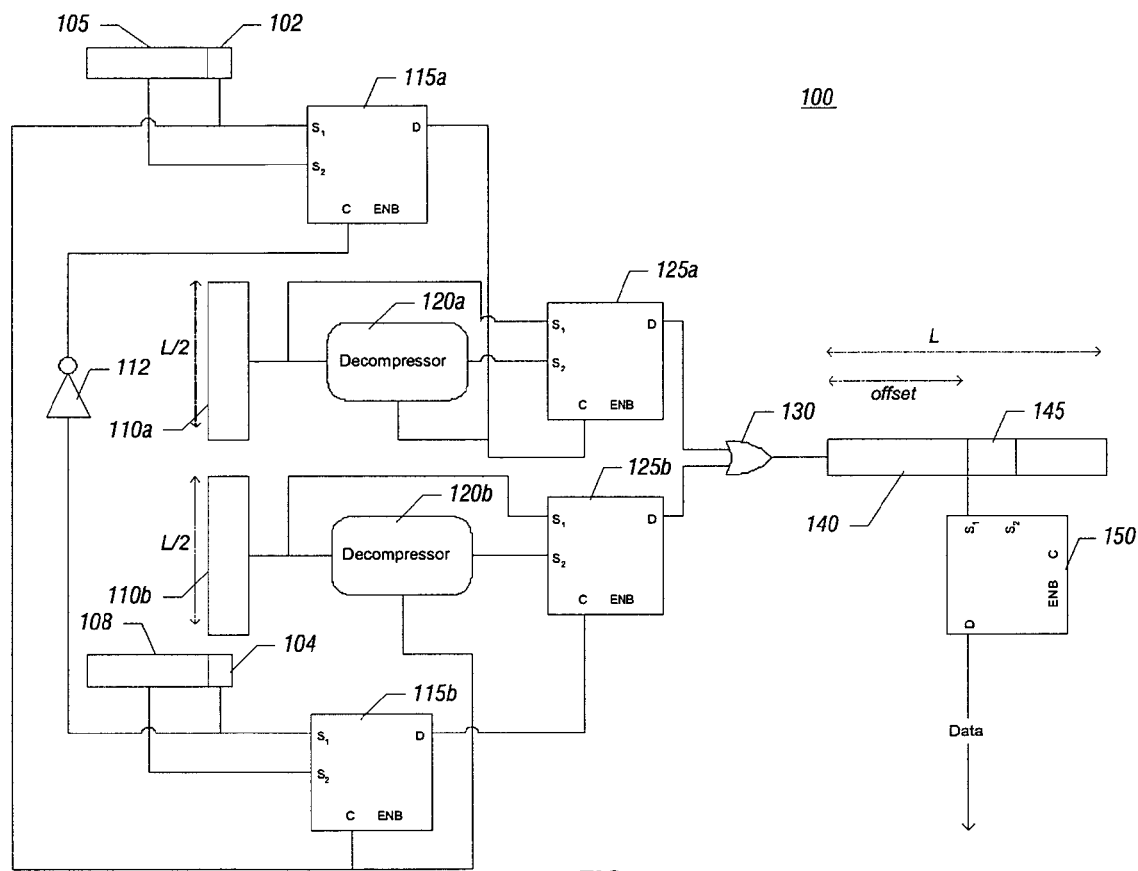
FIG. 4 is a block diagram of control logic for a cache memory in accordance with one embodiment of the present invention.

Referring now to FIG. 4, shown is control logic 100 for tag selection and decompression of a cache line of a cache memory in accordance with an embodiment of the present invention. Control logic 100 may be part of a cache controller, in certain embodiments. As shown in FIG. 4, a physical cache line may be formed of portions 110a and 110b (generically referred to as "cache line 110"), each having a length of L/2, or half of a physical cache line, which corresponds to a logical block of 64 bytes if the cache line is compressed. Otherwise cache line portions 110a and 110b may correspond to a single data block of 64 bytes, although the scope of the present invention is not so limited.

As shown in FIG. 4, cache line portions 110a and 110b may be coupled to corresponding decompressors 120a and 120b. Decompressor 120a may be selected for use based upon an output of a buffer 115a. Buffer 115a may be controlled to generate an output (i.e., on output line D) based upon a valid value of a first tag portion 102 and a second tag portion 104 associated with address tags 105 and 108 corresponding to cache line portions 110a and 110b, respectively. More specifically, if both tag portions 102 and 104 are valid, indicating that the cache line contains compressed data, only the selected portion of the cache line (either portion 110a or 110b) is decompressed in corresponding decompressor 120a or 120b. Specifically, buffer 115a may be controlled based on the value of tag portions 102 and 104 and the presence of a matching address tag 105. Tag portion 104 may be inverted via an inverter 112 and coupled to a clock of buffer 115a. When enabled, buffer 115a may provide a clock signal to control operation of decompressor 120a and an associated data buffer 125a.

Thus, when compressed data is present in cache line portion 110a, it may be decompressed in decompressor 120a and provided to buffer 125a, where it is then output (i.e., via an output D line) to an OR gate 130. The data output by OR gate 130 may thus be represented as a full cache line 140 of length (L) (e.g., 64 bytes). The cache line output by OR gate 130 may be stored in a data buffer 150. From cache line 140, a requested byte of data may be obtained using an offset. This data byte 145 may then be output by data buffer 150 and provided to a requesting processor, for example.

Thus as shown in FIG. 4, each cache line may be associated with a decompressor. If both tag portions are valid, then only the selected line (i.e., a complete logical cache line, corresponding to half a physical line (L/2)) is passed to the decompressor, which decompresses the data, and passes it to a data buffer. If instead the data is not compressed, the data block may be obtained from two lines (i.e., a single logical and physical cache line), bypass the decompressor, and be merged into a single complete cache line (e.g., 64 bytes) in data buffer 150. While not discussed specifically herein, it is to be understood that operation of buffer 115b, decompressor 120b and data buffer 125b may correspond to the above discussion, where cache line portion 110b is selected by a matching address tag 108.

Figure 5:
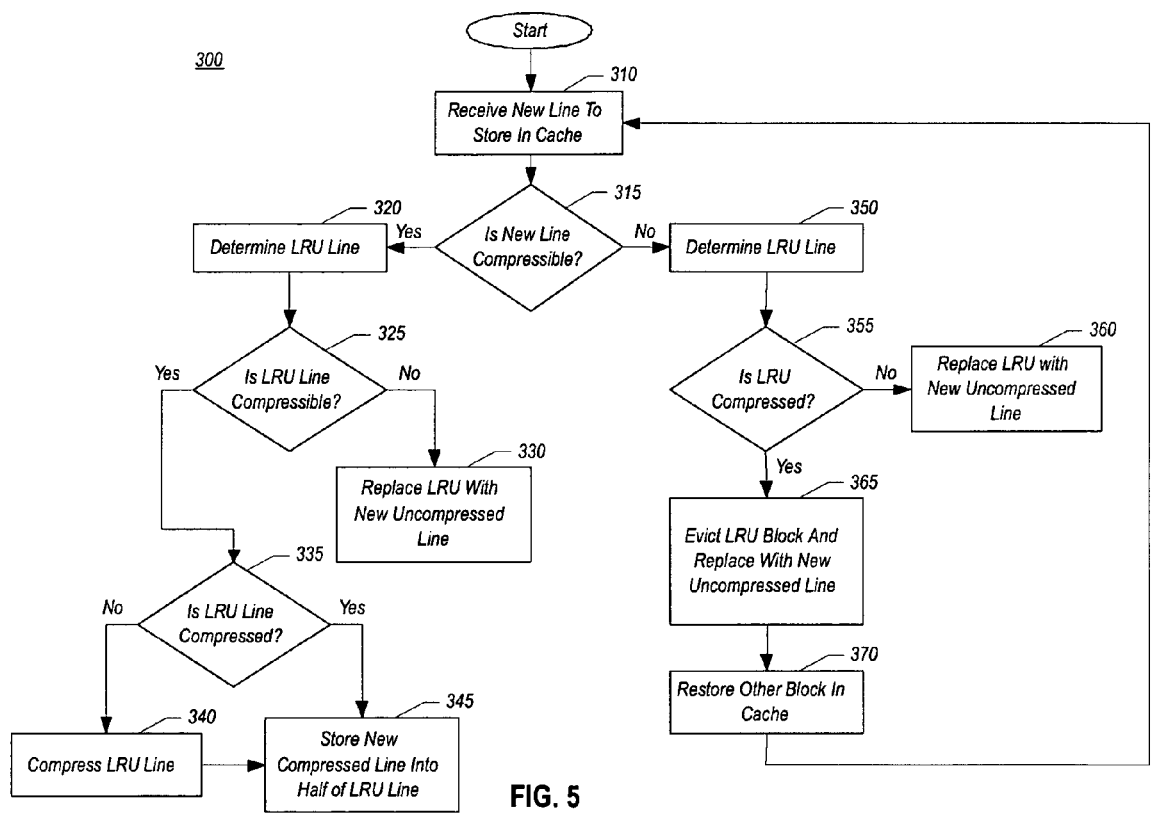
FIG. 5 is a flow diagram of a method in accordance with one embodiment of the present invention.

Referring now to FIG. 5, shown is a flow diagram of a method of inserting data into a compressed cache in accordance with one embodiment of the present invention. The method of FIG. 5 may be performed when new data to be inserted may cause an eviction of data currently present in the cache. As an example, the cache may be filled with data blocks in an uncompressed manner, but when a fill operation would cause an eviction of a stored data block, method 300 may be implemented. Accordingly, method 300 may be implemented as part of a replacement algorithm. Such an algorithm may be implemented by a cache controller.

As shown in FIG. 5, method 300 may begin by receiving a new line to store in the cache (block 310). Such a cache line may be received from another location in a memory hierarchy, such as a different cache, a lower level memory such as a system memory, a mass storage device, or the like. Next, it may be determined if the new line is compressible (diamond 315). In certain embodiments, a cache line is compressible if, according to a given compression algorithm, the amount of data can be reduced by a predetermined factor. For example, in embodiments in which a compression ratio of 2:1 is used, it may be determined whether the new cache line is compressible by a factor of 2. Such a determination may be made by a cache controller, for example. If a cache line is determined to be compressible when stored, a first tag portion corresponding to the cache line may be set as valid.

If it is determined that the new cache line is compressible, a least recently used (LRU) cache line may be determined (block 320). While described herein as using a LRU policy for cache line storage and eviction, in other embodiments, different caching policies may be effected. Then the cache controller or other logic may be utilized to determine whether the LRU line is compressible (diamond 325). As discussed above, a first tag portion may indicate the compressibility of the stored cache line. If the cache line is determined to be compressible at diamond 325, next it may be determined whether the LRU line is in fact compressed (diamond 335). In similar fashion, the compression state of the LRU line may be determined by reference to a second tag portion corresponding to the cache line. As discussed above, a valid second tag portion may indicate a compressed state of the associated cache line.

If it is determined that the cache line is not compressed, the LRU line may be compressed (block 340). Then, the new line may be compressed and stored in half of the LRU line (block 345). Similarly, if it is determined at diamond 335 that the LRU line is compressed, control may directly pass to block 345 for storage of the new line in a compressed manner in the LRU line. If instead at diamond 325 it is determined that the LRU line is not compressible, control may flow to block 330, where the LRU line is replaced with the new cache line in an uncompressed manner.

Still referring to FIG. 5, if at diamond 315 it is determined that the new line is not compressible, control flows to block 350, where an LRU line is determined. Next, at diamond 355 it may be determined whether the LRU line is compressed (diamond 355). As discussed above, the determination of compression may be made by reference to a second tag portion associated with the LRU line. If the LRU line is not compressed, the LRU line may be replaced with the new uncompressed cache line (block 360).

If instead at diamond 355 it is determined that the LRU line is compressed, the LRU line may be replaced with the new uncompressed cache line (block 365). That is, the LRU block of the compressed LRU line may be evicted, and the other block of the LRU line may be restored in another block in the cache (block 370). Accordingly, control may return to block 310 for storage of the other evicted block elsewhere within the cache.

Alternately, if the LRU line is compressed, both compressed blocks may be evicted. However, this may introduce early eviction and extra bus usage. Accordingly, as shown in FIG. 5, the LRU block only may be evicted, and the other compressed block of the LRU line may be re-stored in another line according to the replacement algorithm (e.g., at block 310).

In such manner, a cache memory in accordance with an embodiment of the present invention may be filled with uncompressed cache lines. Then when cache lines are to be evicted, the method 300 or a similar such method may be implemented to reduce evictions from the cache memory by compressing compressible cache lines.

As data is written, the compressibility of the block may change. Two approaches may be taken if a compressed line becomes uncompressible. First, another line may be evicted to make space for the extra line resulting from the expansion of the previously compressed line. Second, the other line may be placed in the cache according to the replacement algorithm. In some embodiments, these approaches can be implemented adaptively by hardware. For example, one or the other policy may be implemented depending on the degree of spatial locality exhibited. In other embodiments, a user control may be provided to select the desired replacement algorithm.

Embodiments may be implemented in code and may be stored on a storage medium having stored thereon instructions which can be used to program a computer system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, or any type of media suitable for storing electronic instructions.

Figure 6:
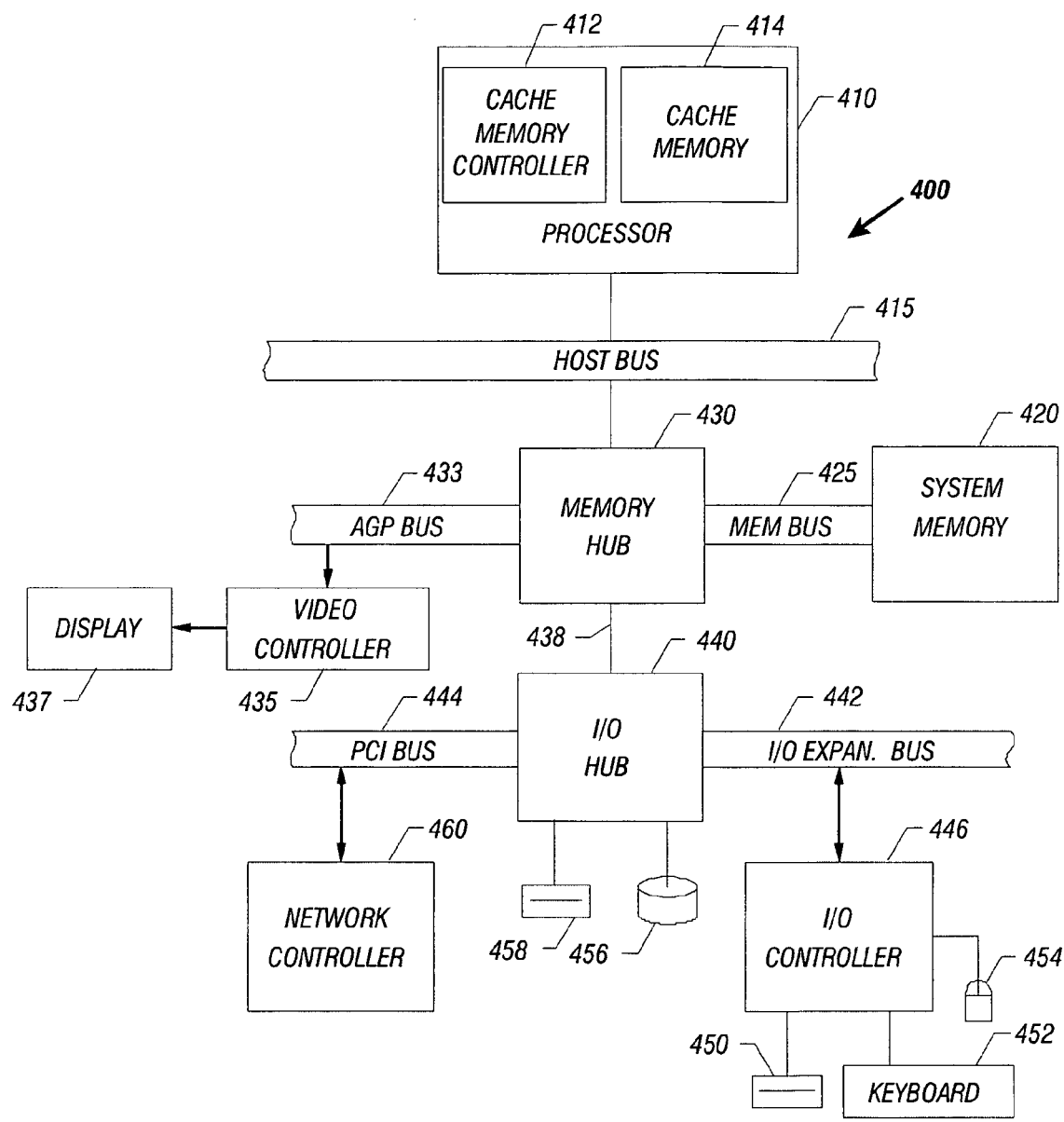
FIG. 6 is a block diagram of a system with which embodiments of the present invention may be used.

Example embodiments may be implemented in software for execution by a suitable computer system configured with a suitable combination of hardware devices. FIG. 6 is a block diagram of computer system 400 with which embodiments of the invention may be used.

Now referring to FIG. 6, in one embodiment, computer system 400 includes a processor 410, which may include a general-purpose or special-purpose processor such as a microprocessor, microcontroller, a programmable gate array (PGA), and the like. As used herein, the term "computer system" may refer to any type of processor-based system, such as a desktop computer, a server computer, a laptop computer, or the like.

As shown in FIG. 6, processor 410 may include a cache memory controller 412 and a cache memory 414 in accordance with an embodiment of the present invention. The processor 410 may be coupled over a host bus 415 to a memory hub 430 in one embodiment, which may be coupled to a system memory 420 (e.g., a dynamic RAM) via a memory bus 425. The memory hub 430 may also be coupled over an Advanced Graphics Port (AGP) bus 433 to a video controller 435, which may be coupled to a display 437. The AGP bus 433 may conform to the Accelerated Graphics Port Interface Specification, Revision 2.0, published May 4, 1998, by Intel Corporation, Santa Clara, Calif.

The memory hub 430 may also be coupled (via a hub link 438) to an input/output (I/O) hub 440 that is coupled to an input/output (I/O) expansion bus 442 and a Peripheral Component Interconnect (PCI) bus 444, as defined by the PCI Local Bus Specification, Production Version, Revision 2.1 dated June 1995. The I/O expansion bus 442 may be coupled to an I/O controller 446 that controls access to one or more I/O devices. As shown in FIG. 6, these devices may include in one embodiment storage devices, such as a floppy disk drive 450 and input devices, such as keyboard 452 and mouse 454. The I/O hub 440 may also be coupled to, for example, a hard disk drive 456 and a compact disc (CD) drive 458, as shown in FIG. 6. It is to be understood that other storage media may also be included in the system.

The PCI bus 444 may also be coupled to various components including, for example, a network controller 460 that is coupled to a network port (not shown). Additional devices may be coupled to the I/O expansion bus 442 and the PCI bus 444, such as an input/output control circuit coupled to a parallel port, serial port, a non-volatile memory, and the like.

Although the description makes reference to specific components of the system 400, it is contemplated that numerous modifications and variations of the described and illustrated embodiments may be possible. More so, while FIG. 6 shows a block diagram of a system such as a personal computer, it is to be understood that embodiments of the present invention may be implemented in a wireless device such as a cellular phone, personal digital assistant (PDA) or the like.

Thus in various embodiments, a cache memory may have a high compression ratio, and may provide significant compression opportunities, in large part because a block can be compressed with any blocks in the same set, regardless of address space.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a plurality of cache lines to store data, at least some of the plurality of cache lines to store data in a compressed state;
   a first tag array to store a first tag corresponding to each of the plurality of cache lines to indicate whether data in a corresponding cache line is compressible, a second tag corresponding to each of the plurality of cache lines to indicate whether the data in the corresponding cache line is in the compressed state, and a first address tag for each of the plurality of cache lines; and
   a second tag array to store the first tag, the second tag, and a second address tag for each of the plurality of cache lines.

2. The apparatus of claim 1, wherein the data in the corresponding cache line is compressed if the first tag and the second tag are valid.

3. The apparatus of claim 1, further comprising a decompressor coupled to the plurality of cache lines to decompress at least a portion of a selected cache line based on a value of the second tag.

4. The apparatus of claim 1, wherein the apparatus comprises an N-way set associative cache memory.

5. The apparatus of claim 4, further comprising way selection logic to select all or a portion of a cache line containing requested data based on the compressed state of the cache line.

* * * * *